United States Patent [19]

Lawton

[11] 4,269,959
[45] May 26, 1981

[54] METHOD OF PREPARING IMPROVED IMBIBITIVE POLYMER

[75] Inventor: Emil A. Lawton, Sherman Oaks, Calif.

[73] Assignee: Whittaker Corporation, Los Angeles, Calif.

[21] Appl. No.: 86,928

[22] Filed: Oct. 22, 1979

[51] Int. Cl.³ ............................................. C08F 20/14
[52] U.S. Cl. ................................... 526/194; 428/402; 526/201; 526/320; 526/323.2; 526/329.1; 526/329.7
[58] Field of Search ............ 526/194, 201, 320, 323.2, 526/329.1, 329.7; 428/402

[56] References Cited

U.S. PATENT DOCUMENTS

| | | | |
|---|---|---|---|
| 2,440,808 | 4/1948 | Neher | 526/329.7 |
| 3,427,262 | 2/1969 | Corte et al. | 526/329.1 |
| 3,548,035 | 12/1970 | Ohe | 526/329.7 |

*Primary Examiner*—Harry Wong, Jr.
*Attorney, Agent, or Firm*—Donald E. Nist

[57] ABSTRACT

An improved imbibitive polymer is prepared by a method which comprises linearly polymerizing methyl acrylate with a free radical-yielding catalyst while the acrylate is suspended in an aqueous medium containing selected suspending agent and while cross-linking the acrylate to a low level with selected cross-linking agent in a concentration of about 0.02–3%, by weight of the acrylate. The aqueous medium is heated and agitated during the reaction to keep the acrylate in fine suspension so that polymethyl acrylate beads are formed which do not agglomerate and which are capable of imbibing liquids having solubility parameters of about 8.5–11.5 Hildebrands. The catalyst concentration is usually about 1%, by weight of the methyl acrylate, and benzoyl peroxide and azo-bis-isobutyronitrile are preferred as the catalyst. The cross-linking agent is preferably divinyl benzene, 1,6-hexane-diol acrylate, ethylene glycol dimethacrylate and mixtures thereof, and is preferably used in a concentration of about 0.11–0.334%, by weight of the methyl acrylate. The suspending agent comprises a viscosity-increasing liquid such as acrylamide and/or sodium polyacrylate, with or without a solid suspending agent such as talc, bentonite, calcium carbonate, kaolin and mixtures thereof. Preferably an additional amount of catalyst is utilized near the end of the reaction to inhibit coalescence or agglomeration of the formed polymethyl acrylate beads.

5 Claims, No Drawings

METHOD OF PREPARING IMPROVED IMBIBITIVE POLYMER

BACKGROUND OF THE INVENTION

1. Field of the Invention

The present invention generally relates to polymers and more particularly to a method of preparing an improved polymer in bead form having an improved imbibitive property.

2. Prior Art

Various types of imbibitive polymers are known. Certain of those polymers swell in hydrocarbons and others of those polymers swell in water. For example, certain of the latter type are used for soft contact lenses and the like. However, none of the imbibitive polymers heretofore known are capable of imbibing and releasing liquids, the solubility parameters of which are in the range of 8.5–11.5 Hildebrands. It would be desirable to provide such polymers in bead form or the like so that known toxic agents, pesticides, perfumes and selected medicines in liquid form could be imbibed for subsequent controlled release from the polymers.

SUMMARY OF THE INVENTION

The method of the present invention satisfies the foregoing needs. The method is substantially as set forth in the Abstract above. The method is simple, economical, rapid and reproducible and results in the preparation of polymethyl acrylate beads which do not agglomerate and which are capable of imbibing liquids having solubility parameters of about 8.5–11.5 Hildebrands and of swelling in so doing and then of releasing the imbibed liquids without any damage to the beads. The method involves linearly polymerizing methyl acrylate while it is suspended in finely dispersed form in an aqueous medium containing a viscosity-increasing liquid suspending agent and/or a finely divided particulate solid suspending agent. The linear polymerization is carried out with a free radical-yielding catalyst at a temperature sufficiently high to release the free radical from the catalyst. Moreover, the polymerization is effected in the presence of a selected cross-linking agent in a controlled low concentration of about 0.02–3%, by weight of the methyl acrylate, so as to provide the resulting polymethyl acrylate beads with the desired imbibitive properties. The materials utilized for the linear polymerization and cross-linking and to provide the desired suspension are readily available and simple to handle. Stirring of the medium is continuously carried out to ensure that the methyl acrylate remains properly suspended and that the beads formed therefrom are of proper size and shape. Such beads have an average diameter of about 150–1,000 μm. Further features of the present invention are set forth in the following detailed description.

DETAILED DESCRIPTION

The method of the present invention comprises linearly polymerizing methyl acrylate in an aqueous medium while the acrylate is suspended in a fine dispersion or emulsion. The linear polymerization is effected through the use of a free radical-yielding catalyst. Although any suitable catalyst can be used, it is preferred that the catalyst be benzoyl peroxide or azo-bis-isobutyronitrile. The aqueous medium preferably comprises a suitable buffering agent such as an aqueous buffer solution of sodium dihydrogen phosphate and disodium hydrogen phosphate. There should also be present in the aqueous medium a suspending agent which helps to keep the liquid methyl acrylate droplets properly suspended during the polymerization so that the desired polymethyl acrylate beads are formed therefrom. This suspending agent usually comprises a liquid organic viscosity-increasing material such as sodium polyacrylate (15%, by weight concentration in aqueous solution) and/or polyacrylamide. The polyacrylamide may be used, for example, in a 1%, by weight concentration in the aqueous solution. Preferably, the suspending agent also includes a solid particulate material selected from the group consisting of talc, bentonite, calcium, carbonate, kaolin and mixture thereof. It has been found that of these four materials bentonite is the least desirable. The solid suspending agent may be present, for example, in a concentration of about 1–5%, by weight of the methyl acrylate. Although the concentration of the methyl acrylate in the aqueous medium may vary, typically the methyl acrylate is present in an amount of about 0.10–0.30 g per ml. of the aqueous medium.

Also present in the reaction mixture is a suitable cross-linking agent in a concentration of about 0.02–3.0%, by weight of the methyl acrylate. The cross-linking agent is selected from the group consisting of divinyl benzene, 1,6-hexane-diol acrylate, ethylene glycol dimethacrylate and mixtures thereof. Preferably the cross-linking agent is present in a concentration of about 0.11–0.334%, by weight of the methyl acrylate. Normally, all or substantially all of the cross-linking agent utilized in the reaction mixture enters into the reaction so that the extent of the cross-linking is directly controlled by controlling the concentration of the cross-linking agent in the reaction mixture.

Accordingly, the materials present initially to effect the linear polymerization, together with cross-linking of the methyl acrylate, comprise the aqueous medium, the suspending agent or agents, the methyl acrylate, the cross-linking agent and, usually, a buffer solution. Of course, the catalyst is also present.

In order to initiate the reaction in the reaction mixture in the reaction zone, such as a suitable resin cooking vessel or the like, the mixture is heated, while stirring or other agitation is effected to keep the components in the reaction mixture in uniform suspension. A mechanical stirrer preferably is operated at, for example, for about 400–500 rpm. The reaction mixture is heated gradually (in about 15–30 minutes) to reaction temperature of about 79°–81° C. A water bath or the like may be used for the heating.

Once the reaction temperature is reached and the reaction initiated, there is a temporary rise in the temperature of the reaction mixture due to the initially exothermic nature of the reaction, so that external heating is removed until this initial exothermic reaction subsides (within about 15–20 minutes). Sufficient external heating is thereafter applied to the reaction mixture to maintain the reaction and to decompose substantially all of the catalyst within a half-hour period or the like. The reaction mixture is maintained at about 79°–81° C. for a total of about 2–3 hours, after which the heated mixture is removed and allowed to cool. In order to assure that the polymethyl acrylate beads formed during the reaction do not substantially agglomerate, a small additional amount of the catalyst preferably is added to the reaction mixture after this cooling, and the mixture is then reheated to the reaction temperature (79°–81° C.) and maintained at that temperature for about one hour. This assures that the exterior of the formed beads will have sufficiently polymerized to eliminate their cohesivity. Final cooling is then effected to ambient temperature and the beads are washed, as with water or the like, after separation from the liquids in the mixture. The purified washed beads are then dried and are ready for use.

It has been found that this procedure produces beads having an average diameter of about 150–1,000 μm and that such beads are particularly suitable for use in absorbing and releasing pesticides, aromatics for use in perfumes, flavoring agents and in various other applications. The beads are free-flowing and do not agglomerate and can be kept in a useful condition indefinitely. In the manufacturing procedure, the cross-linking agent's concentration must be controlled within the specified limits to provide sufficient cross-linking so that the beads do not dissolve in the material that they are designed to imbibe. However, too much cross-linking agent in the reaction will result in beads which do not swell and imbibe to the desired degree. The catalyst's concentration is also variable and important. Its concentration should be such so that a so-called living polymer of polymethyl acrylate is generated during the reaction which polymer has sufficient reactive centers to maintain the reaction until chain termination steps occur. Too low a catalyst concentration generates longer chain polymers but insufficient centers to complete the polymerization. Too much catalyst yields polymers of too low a molecular weight with too many reactive centers and could react explosively.

The liquid and solid suspending agents in the mixture appear to act synergistically, with the liquid suspending agent increasing the aqueous solution's viscosity sufficiently, so that droplets of the polymethyl acrylate forming in the stirred aqueous solution are properly dispersed, while the solid suspending agent keeps these dispersed droplets from coalescing until the droplets become sufficiently cross-linked to form solid beads. The additional amount of catalyst, as noted above, in the final reaction steps, assures that these beads will not adhere together.

Further aspects of the invention are set forth in the following specific examples.

EXAMPLE I

To a 500 ml. resin preparation kettle, equipped with a dropping funnel, a reflux condenser, thermometer and mechanical stirrer, was added a 1% (by weight) solution of sodium polyacrylate in water (160 ml). To this were then added a stock aqueous buffer solution of a mixture of sodium dihydrogen phosphate and disodium hydrogen phosphate (5.5 ml) and a solid particulate suspending agent in the form of talc (0.70 g.) and the stirrer was then activated to stir the mixture at about 400 rpm. In a separate beaker was weighed out methyl acrylate (35 g. under a hood) and divinylbenzene (0.070 ml, 0.064 g; 0.18% of the methyl acrylate) was pipetted into the beaker and then benzoyl peroxide (0.35 g, 1% of the methyl acrylate) was added with stirring to the beaker. This solution was then added to the resin kettle, and the air above the liquid in the kettle was blown out lightly with prepurified nitrogen. The stirrer speed was now reduced to 250 rpm and after a few minutes the temperature was increased to reaction temperature (about 79°–80° C.) with an external hot water bath. After about 15 minutes there was a slight exotherm to 83° C., whereupon the heating bath was removed until the temperature dropped to 78° C. and then the heating was resumed. The reaction proceeded another hour and a half at 79°–80° C. The reaction mixture was then allowed to cool to 45° C. whereupon more benzoyl peroxide (0.15 g) was added to the mixture with stirring at 250 rpm and the reaction flask was heated to 73° C. for another hour. On cooling, the reaction mixture was then transferred to a stoppered flask and portions thereof were worked up separately. The product consisted almost entirely of discrete spherical beads of polymethyl acrylate with only a few streamers and agglomerates. Even on filtering, washing with water and drying, the beads remained free flowing indefinitely.

EXAMPLE II

To a 500 ml. resin kettle, equipped with a dropping funnel, reflux condenser, thermometer and a mechanical stirrer, were added distilled water (165 ml) and polyacrylamide (1.65 g) to form a 1% solution. The contents were stirred with gentle warming until the solution was clear. Then a buffer solution (5 ml of an aqueous solution of 0.055 g of $NaH_2PO_4H_2O$ and 0.93 g of $Na_2HPO_4$) and 0.16 g of kaolin were added to the solution. In a separate beaker was dissolved divinyl benzene (0.117 g; 0.334% of methylacrylate) in 35 g of methyl acrylate, followed by 0.35 g (1% of methyl acrylate) of benzoyl peroxide. This mixture was added to the mixture in the resin kettle with vigorous stirring (580 rpm). A milky dispersion or emulsion was formed while the kettle was blown out gently with a stream of nitrogen. The stirring speed was then lowered to 300 rpm and the kettle was then heated with a water bath to 72° C. After a slight exotherm of 81° C., the temperature of the reaction was maintained at 79° C. for 2 hours.

The reaction mixture was then allowed to cool to 40° C., and an additional 0.18 g of benzoyl peroxide was added, with the kettle contents then being reheated to being maintained at 76° C.+2° C. for another hour. After cooling, the excess liquid was decanted, and the resulting beads were washed repeatedly with water on a Buchner Funnel and dried. The yield was 34.4 g (98.3% of theoretical) of spherical polymethyl acrylate beads ranging in size from 150 μm to 700 μm in diameter, with most beads falling into the 250 μm range. It was found that those beads were swelled easily by diethyl malonate and ethyl lactate to between 2 to 3 times their diameter.

EXAMPLE III

In a one liter resin kettle equipped with a teflon mechanical stirrer, reflux condenser, dropping funnel and thermometer were placed a solution of 32.1 g of sodium polyacrylate diluted to 430 ml in water to which 16.5 ml of the buffer solution of Example II had been added. Then talc (2.80 g) was stirred into the mixture to give an even suspension, and methyl acrylate (105 g) containing 0.19 g (0.18%) of ethylene glycol dimethacrylate and 1.05 g of azo-bis-isobutyronitrile (AIBN) was added with stirring (480 rpm). After five minutes of stirring, when the milky suspension had stabilized, the reaction kettle was heated and the stirring speed was reduced to 415 rpm. When the kettle contents reached 66° C., beads could be seen forming copiously in the mixture. When the temperature reached 79° C., external heating was suspended until the mild exotherm was over, (10 minutes) and then the reaction mixture was maintained at 79°+2° C. for about two hours. The reaction mixture was then cooled to 35° C., whereupon another 0.45 g of AIBN was added to the kettle and the reaction mixture was heated up to 78° C.±2° C. and maintained at that temperature for another hour. The finished beads in the kettle were separated from the liquid by decanting, washed in water and dried. It was found that 91.3 g (87.0% yield) of beads were obtained with only a few fine streamers of agglomerated beads.

EXAMPLE IV

This reaction was conducted in the same apparatus and under the same conditions as set forth in Example III. The differences were that a 1% aqueous solution of polyacrylamide and 3 g of calcium carbonate (precipitated, light powder, USP) were used as suspending agents, while 1,6-hexandiol diacrylate (0.25% of methyl acrylate) was used as the cross-linking agent. The reaction was conducted as above with an initial stirring speed of 460 rpm reduced to 300 rpm when the mixture reached the reaction temperature of 76° C. The reaction was maintained at 76°±1° C. for 3¼ hours, whereupon another 0.30 g of AIBN was added through the reflux condenser without the cooling. On water washing and drying 94.9 g of polymethyl acrylate beads were obtained (90.4% of theoretical). A few of the beads did form aggregates, so that the product was then sieved and the aggregates were placed in a Waring Blender for three minutes at the lowest speed. This treatment broke up the aggregates to small individual beads which exhibited excellent swelling in liquids such as diethyl malonate and ethyl lactate. Both of those esters are commercial flavoring agents. The beads were found to be useful in formulations for the controlled release of these and other flavorings and the release of such esters as are used in perfumes and the like. The beads remained free-flowing indefinitely.

Ethyl lactate has a solubility parameter of 9.3. A bead from Example I having an original diameter of 392 $\mu$m increased in diameter to 834 $\mu$m in 90 minutes when immersed in the ethyl lactate. This represented a swelling ratio of 2.13 and a bead volume increase of 9.63:1. Similarly, when beads having diameters, respectively, of 250 $\mu$m and 341.7 $\mu$m were swelled in diethyl malonate, they exhibited swelled diameters, respectively, of 500 $\mu$m and 758.5 $\mu$m following 30 minutes of immersion in the diethyl malonate. Thus, swell ratios of 2.0 and 22.2 with swell volumes of 8.0 and 10.9 were exhibited.

Beads from the second specific example exhibited swell ratios of 2.01 and swell volumes of 8.12 when immersed in a mixture of dichloro-propanol and acetone (solubility parameter of 11.0). Beads from Example III exhibited swell ratios of about 2.53 and volume expansions of about 16.1 in diethyl malonate while beads from Example IV had swell ratios of 2.53 and 2.57 (in two different tests), exhibiting volume expansions of 16.2 and 17.0, respectively, in diethyl malonate. None of the beads from any of these four specific examples were swelled by isopropyl alcohol which has a solubility parameter of 11.5.

Thus, the beads as provided by the method of the present invention are readily swellable by liquids having solubility parameters in the range from about 9.0 to about 11.0.

The desorption rates for a series of beads saturated with diethyl malonate were determined. It was observed that the rate of release of the slightly volatile liquid from a bead with a given radius could be correlated by a generalized rate constant, $C_r$, which described all sizes of beads from 150 $\mu$m to 1000 $\mu$m in diameter by the relationship $C_r = k_r r_o^2$ where $k_r$ was the specific release constant for given size bead and $r_o$ was the initial radius of the swollen bead. For diethyl malonate at 25°±2° C., $C_r = 0.125 \pm 0.015 \times 10^{-4}$ cm$^2$/min. Thus given $C_r$, $k_r$, the specific release constant, could be calculated for any bead size. The value of $k_r$ is equal to ln 2/$t_{\frac{1}{2}}$ where $t_{\frac{1}{2}}$ is the time for the bead to desorb one-half of its liquid. For example, if the initial radius is 250 $\mu$m or 0.025 cm then:

$$k_r = (0.125 \times 10^{-4})/0.025^2 = 0.02 \text{ min}^{-1}$$

Then the time for this bead to lose half of its liquid would be given by $k_r = \ln 2/t_{\frac{1}{2}}$ or $t_{\frac{1}{2}} = 0.693/0.02$ $t_{\frac{1}{2}} = 34.7$ minutes.

Using these data and the techniques described, it is possible to calculate the rate of release of similar liquids. The diffusion coefficient, D, of diethyl malonate in the beads was found to be $5.94 \pm 0.71 \times 10^{-9}$ cm$^2$/sec. The diffusion coefficient can also be used to also calculate the desorption rates by use of well known relationships of Lewis and Cowsar (ACS Symposium Series 53, AM. Chem. Soc., Washington, D.C., 1977, p.1–16):

$$\frac{M_t}{M_\infty} = 6\left(\frac{D^t}{r_o^2 \pi}\right)^{\frac{1}{2}} - \frac{3D^t}{r_o^2}$$

$$\frac{M_t}{M_\infty} = 1 - \frac{6}{\pi^2} \exp\left(\frac{\pi^2 D^t}{r_o^2}\right)$$

The early time approximation is for 0 to 60% desorption and the late is for 40 to 95% desorption.

$M_t$ = mass remaining after a finite period of time = t and $M_\infty$ = mass present where time = 0.

These release constants can be used to calculate the amount of pheromone that would be released at over a given time to attract and confuse various insects and prevent them from breeding. Accurate dosages can be calculated for covering a definite area.

Various other applications can be made utilizing the improved imbibitive polymer of the present invention, the features of which and the advantages of the method of preparing the same are as set forth above. Modifications, changes, alterations and additions can be made to the polymer and its method of preparation, the components for the polymer and the steps and parameters for the method. All such modifications, changes, alterations and additions as are within the scope of the appended claims form part of the present invention.

What is claimed is:

1. A method of preparing an improved imbibitive polymer, said method comprising:
    a. linearly polymerizing with a free radical-yielding catalyst selected from the group consisting of benzoyl peroxide, azo-bis-isobutyro-nitrile and mixtures thereof, a suspension of methyl acrylate in an aqueous medium, the concentration of said catalyst being about 1% by weight of the methyl acrylate, said medium containing a selected suspending agent comprising liquid suspending agent selected from the group consisting of sodium polyacrylate, polyacrylamide and mixtures thereof in a concentration of about 1–15% by weight of the methyl acrylate and a solid suspending agent selected from the group consisting of talc, bentonite, calcium carbonate, kaolin and mixtures thereof, said solid suspending agent being in a concentration of about 1-5% by weight of the methyl acrylate, said linear polymerizing being carried out while cross-linking the partially polymerized methyl acrylate with cross-linking agent selected from the group consisting of divinyl benzene, 1,6-hexane-diol acrylate, ethylene glycol dimethacrylate and mixtures thereof, said cross-linking agent being present in a concentration of about 0.02-0.4%, by weight of said methyl acrylate; and, b. recovering the resulting lightly cross-linked polymethyl acrylate beads having an average diameter of about 150-1000 μm, said beads being capable of imbibing liquids with solubility parameters of about 8,5-11.5 Hildebrands.

2. The method of claim 1 wherein said medium is agitated during said polymerization to facilitate formation of said beads.

3. The method of claim 1 wherein said medium is heated to effect full decomposition of said catalyst.

4. The method of claim 3 wherein an additional amount of said catalyst, about 0.5% by weight of said methyl acrylate, is added to the reaction mixture about two hours after said polymerization is initiated in order to inhibit agglomeration of the said beads.

5. The method of claim 1 wherein the concentration of said cross-linking agent is about 0.11-0.334%, by weight of said methyl acrylate.

* * * * *